(12) United States Patent
Llano et al.

(10) Patent No.: US 10,859,003 B2
(45) Date of Patent: Dec. 8, 2020

(54) CONTROL SYSTEM FOR A GAS TURBINE ENGINE

(71) Applicant: ROLLS-ROYCE PLC, London (GB)

(72) Inventors: Luis F Llano, Derby (GB); Arthur L Rowe, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/666,928

(22) Filed: Oct. 29, 2019

(65) Prior Publication Data

US 2020/0141330 A1 May 7, 2020

(30) Foreign Application Priority Data

Nov. 5, 2018 (GB) .................................. 1818014.1

(51) Int. Cl.
| | |
|---|---|
| *F02C 9/18* | (2006.01) |
| *F02C 9/20* | (2006.01) |
| *F01D 17/16* | (2006.01) |
| *F02C 7/36* | (2006.01) |
| *F02K 3/06* | (2006.01) |

(52) U.S. Cl.
CPC ................. *F02C 9/18* (2013.01); *F02C 9/20* (2013.01); *F01D 17/162* (2013.01); *F02C 7/36* (2013.01); *F02K 3/06* (2013.01); *F05D 2220/3215* (2013.01); *F05D 2220/3219* (2013.01); *F05D 2270/20* (2013.01); *F05D 2270/313* (2013.01)

(58) Field of Classification Search
CPC ...... F02C 6/08; F02C 9/18; F02C 9/20; F02C 9/28; F02C 9/50; F02C 9/52; F02C 9/54; F01D 11/24; F01D 17/162; F05D 2270/20
See application file for complete search history.

(56) References Cited

U.S. PATENT DOCUMENTS

| | | | | |
|---|---|---|---|---|
| 4,157,010 A * | 6/1979 | Sailer | .......................... | F02C 3/10 60/774 |
| 5,385,012 A * | 1/1995 | Rowe | .......................... | F02C 9/18 60/779 |
| 6,615,574 B1 * | 9/2003 | Marks | .......................... | F02C 7/18 60/772 |
| 6,794,766 B2 * | 9/2004 | Wickert | .................. | F01D 15/10 290/52 |
| 8,291,690 B1 * | 10/2012 | Wehmeier | ................. | F02C 9/20 60/226.3 |
| 8,490,379 B2 * | 7/2013 | Nomura | ..................... | F02C 9/28 60/39.281 |
| 9,103,228 B2 * | 8/2015 | Waugh | .................. | F01D 17/162 |
| 2009/0056342 A1 | 3/2009 | Kirzhner | | |

(Continued)

FOREIGN PATENT DOCUMENTS

| | | |
|---|---|---|
| EP | 2 594 749 A2 | 5/2013 |
| GB | 2 251 657 A | 7/1992 |

(Continued)

*Primary Examiner* — Scott J Walthour
(74) *Attorney, Agent, or Firm* — Oliff PLC

(57) ABSTRACT

A control system for a gas turbine engine includes an engine core, the engine core including combustion equipment, a turbine, a compressor, and a core shaft connecting the turbine to the compressor. The control system includes at least one variable stator vane for controlling the angle at which gas enters the engine core, and there is a bypass passage within the engine core for directing gas flow to bypass the combustion equipment.

13 Claims, 12 Drawing Sheets

(56) References Cited

U.S. PATENT DOCUMENTS

| | | | |
|---|---|---|---|
| 2010/0281875 A1* | 11/2010 | Price | F01D 17/162 60/772 |
| 2011/0142602 A1* | 6/2011 | Adhami | F02C 9/20 415/159 |
| 2012/0167587 A1* | 7/2012 | Clark | F02C 9/18 60/782 |
| 2013/0319009 A1* | 12/2013 | Parente | F02C 7/057 60/805 |
| 2015/0308353 A1* | 10/2015 | Gardner | F02C 9/54 60/773 |
| 2016/0069277 A1* | 3/2016 | Meisner | F02C 9/52 60/773 |
| 2017/0058784 A1 | 3/2017 | Vandale et al. | |
| 2017/0167273 A1* | 6/2017 | Maguire | F01D 11/24 |

FOREIGN PATENT DOCUMENTS

| | | |
|---|---|---|
| WO | 2008/123904 A2 | 10/2008 |
| WO | 2018/012100 A1 | 1/2018 |

* cited by examiner

CONTROL SYSTEM FOR A GAS TURBINE ENGINE

BACKGROUND OF THE DISCLOSURE

The present disclosure relates to optimisation of an engine's thermodynamic cycle.

Conventional gas turbine engines are designed to operate in a wide range of conditions that result from variations in the engine environmental conditions and flight speeds, and therefore need to fulfil the various power demands that are required during the flight cycle. Gas turbine engines also need to be designed to accommodate for the effects of component deterioration, to ensure that it delivers the minimum guaranteed thrust throughout its life in service.

As a result, conventional gas turbine engines are designed to satisfy a large number of requirements which are often conflicting, resulting in compromises made to the design.

For instance, the engine must be physically sized to meet the high-power demand during the most arduous conditions, where peak temperatures are achieved, whilst ensuring safe operation within the component's temperature capability. However, the engine will mostly operate at much lower power demands and less arduous conditions, for which the engine will be over-sized, thus compromising on attributes such as cycle efficiency and engine weight.

One known way of improving the cycle efficiency whilst still meeting the high-power demand, is to employ a variable cycle engine. Most of these engines are developed in the context of aero derivative gas turbines for military application, which try to resolve the conflicting requirements that result from the extreme operating conditions that military engines need to fulfil. The primary idea behind these engines relies on combining the attributes of a high turbine temperature turbojet, (i.e. high dry specific thrust and low max power specific fuel consumption) with those of a turbofan engine (i.e. low part power specific fuel consumption). Some known variable cycle engines use variable compressor geometry to effect on the engine cycle, whilst others use variable turbine vanes to effect on the turbine flow capacity to change the engine cycle.

Other known variable cycle engines alternate between a high-thrust mode for maximum power and a high-efficiency mode for optimum fuel savings, by controlling the air flow that goes into the core and the bypass. This is achieved by use of adjustable fans and controllable air ducts which can control the amount of air that goes into the core versus the amount of air that goes in to the bypass.

However, the use of variable cycle engines in aero gas turbines for Civil Large Engine (CLE) applications is limited, primarily because of the impact on the engine when such methods are applied. Increases in engine length, weight, and complexity, as well as increased costs associated with the development and production of such engines generally outweighs any advantages provided.

Moreover, convention gas turbine engines must be overdesigned to accommodate for the effects of component deterioration lead to increases in the engine's core temperatures and shaft speeds.

One known way of ensuring safe operation within the component's temperature capability is to employ a booster compressor having variable stator vanes. This is known to reduce the core turbine temperatures during high power demands, but is also known to have a detrimental effect on the compressor delivery temperature (T30) and high-pressure (HP) shaft speed.

There is proposed an engine arrangement and/or a method of controlling the engine arrangement that overcomes or mitigates one or more of the aforementioned problems.

BRIEF SUMMARY OF THE DISCLOSURE

According to a first aspect there is provided a control system for a gas turbine engine comprising an engine core comprising combustion equipment, a turbine, a compressor, and a core shaft connecting the turbine to the compressor; the control system comprising at least one variable stator vane for controlling the angle at which gas enters the engine core; and a bypass passage provided within the engine core for directing gas flow to bypass the combustion equipment.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The bypass passage may direct gas flow from the second compressor to the second turbine.

The second turbine may comprise at least one nozzle guide vane and the bypass passage may reintroduce the gas flow downstream of the at least one nozzle guide vane.

The first compressor may comprise the at least one variable stator vane. The at least one variable stator vane may comprise at least one variable stator vane that moves between an open position and a closed position. The at least one variable stator vane may be fully variable. The at least one variable stator vane may comprise a plurality of variable stator vanes, and each of the plurality of variable stator vanes may be simultaneously moved to the same position between the open position and the closed position.

The at least one variable stator vane may be configured to be adjusted according to a nominal schedule so as to control the angle at which gas enters the engine core. The nominal schedule may be dependent on the semi-dimensional rotational speed (or corrected speed) of the first compressor.

The adjustment of the at least one variable stator vane may be configured to be biased from the nominal schedule in response to a first input. The first input may indicate that the engine core temperature is above, at, or approaching, a first predetermined threshold. The first predetermined threshold may be a maximum engine core temperature operating limit. The first input may be any of, or any combination of, a power setting parameter, the inlet temperature to the intake of the turbine, the turbine entry temperature, and the second compressor inlet total temperature.

The bypass passage may comprise at least one valve for controlling the amount of air that enters the bypass passage. The at least one valve may comprise at least one variable valve that moves between an on position and an off position. The at least one variable valve may be fully variable. The at least one valve may comprise at least one on-off valve that moves between an on position and an off position. The at least one valve may comprise a plurality of valves, and each of the plurality of valves may be controlled as one entity. Alternatively, each of the plurality of valves may be independently controllable.

The at least one valve may be configured to be adjusted according to a nominal schedule so as to control the amount of air that enters the bypass passage. The nominal schedule may be dependent on a power setting parameter and/or the altitude of the gas turbine engine.

The at least one valve may be configured to be biased from the nominal schedule in response to a second input. The second input may indicate that the compressor delivery temperature is above, at, or approaching, a second predetermined threshold. The second predetermined threshold may be a maximum compressor delivery temperature operating limit. The second input may be any of, or any combination of, a power setting parameter, the inlet temperature to the intake of the turbine, the compressor delivery temperature, and the altitude of the gas turbine engine.

The at least one valve may be configured to be in an open position when the gas turbine engine is operating in idle and/or low power conditions.

According to a further aspect of the invention there is provided a gas turbine engine for an aircraft comprising: an engine core comprising combustion equipment, a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft; at least one variable stator vane for controlling the angle at which gas enters the engine core; and a bypass passage provided within the engine core for directing gas flow so as to bypass the combustion equipment.

The turbine may be a first turbine, the compressor may be a first compressor, and the core shaft may be a first core shaft. The engine core may further comprise a second turbine, a second compressor, and a second core shaft connecting the second turbine to the second compressor; and the second turbine, second compressor, and second core shaft may be arranged to rotate at a higher rotational speed than the first core shaft.

According to a third aspect there is provided a control system for a gas turbine engine comprising an engine core comprising combustion equipment, a turbine, a compressor, and a core shaft connecting the turbine to the compressor; the control system comprising at least one variable stator vane for controlling the angle at which gas enters the engine core; a bypass passage provided within the engine core for directing gas flow so as to bypass the combustion equipment, the bypass passage comprising at least one valve for controlling the amount of air that enters the bypass passage; and at least one processor; the at least one processor configured to read computer readable instructions to cause performance of: adjusting of the at least one variable stator vane according to a nominal schedule so as to control the angle at which gas enters the engine core, the nominal schedule being dependent on the semi-dimensional rotational speed (or corrected speed) of the first compressor; and adjusting of the at least one valve according to a nominal schedule so as to control the amount of air that enters the bypass passage, the nominal schedule being dependent on a power setting parameter.

The at least one processor may also be configured to read computer readable instructions to cause performance of: biasing the adjustment of the at least one variable stator vane from the nominal schedule in response to a first input; and biasing the adjustment of the at least one valve from the nominal schedule in response to a second input.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture.

In such an arrangement where the engine core further comprises a second turbine, a second compressor, and a second core shaft connecting the second turbine to the second compressor, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forward most) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20. In other arrangements the bypass ratio may be less than 10. The bypass ratio may be in an inclusive range bounded by any two of the values in the previous sentences (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K, 1650K, 1700K, 1750K, 1800K, 1850K, 1900K, 1950K or 2000K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K, 2000K, 2050K, 2100K, 2150K, 2200K, 2250K, 2300K, 2350K, 2400K, 2450K or 2500K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or a bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Figure 1:
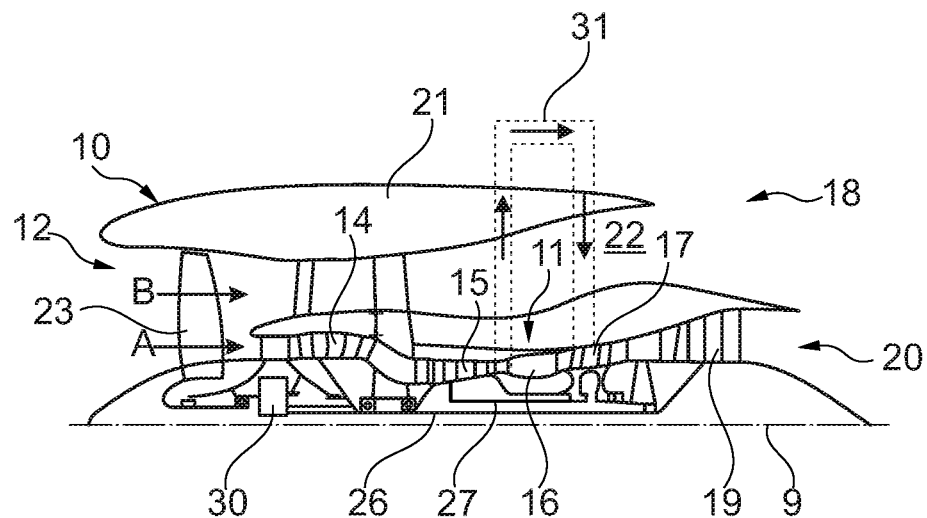
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a booster (or intermediate-pressure) compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30. The low-pressure turbine 19 also drives the booster compressor 14. The booster compressor 14 comprises one or more rows of variable stator vanes. Any number from one to all of the rows of stator vanes may be variable. Where the booster compressor additionally or alternatively comprises variable inlet guides (VIGVs), only the first inlet vane is variable.

In use, the core airflow A is compressed by the booster compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

The engine 10 also includes a core size modulation system, the core size modulation system comprising a switchable air system 31, which carries air from the high-pressure compressor 15 to the high-pressure turbine 17, bypassing the combustion equipment 16. After bypassing the combustion equipment 16, the air is re-introduced downstream of the first row of high-pressure turbine nozzle guide vanes. Although the air bypasses the combustion equipment 16, the air remains in the core 11.

Figure 2:
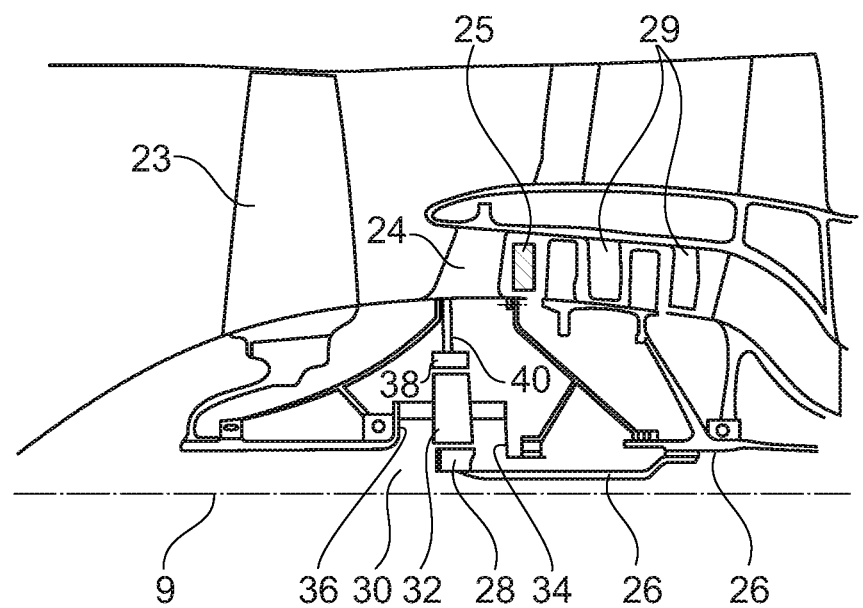
FIG. 2 is a close up sectional side view of an upstream portion of a gas turbine engine.

An exemplary arrangement for a geared fan gas turbine engine 10 is shown in FIG. 2. The low-pressure turbine 19 (see FIG. 1) drives shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24. Also shown are a number of rows of stator vanes 25, 29, of which at least one row is a row of variable stator vanes 25, in that the stator vane angle of incidence is variable. In some arrangements, more than one, or all but one, of the rows of stator vanes 25, 29 may be variable stator vanes.

Note that the terms "low-pressure turbine" and "low-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low-pressure turbine" and "low-pressure compressor" referred to herein may alternatively be known as the "intermediate pressure turbine" and "intermediate pressure compressor" or "booster compressor". Where such alternative nomenclature is used, the fan 23 may be referred to as a first, or lowest pressure, compression stage.

Figure 3:
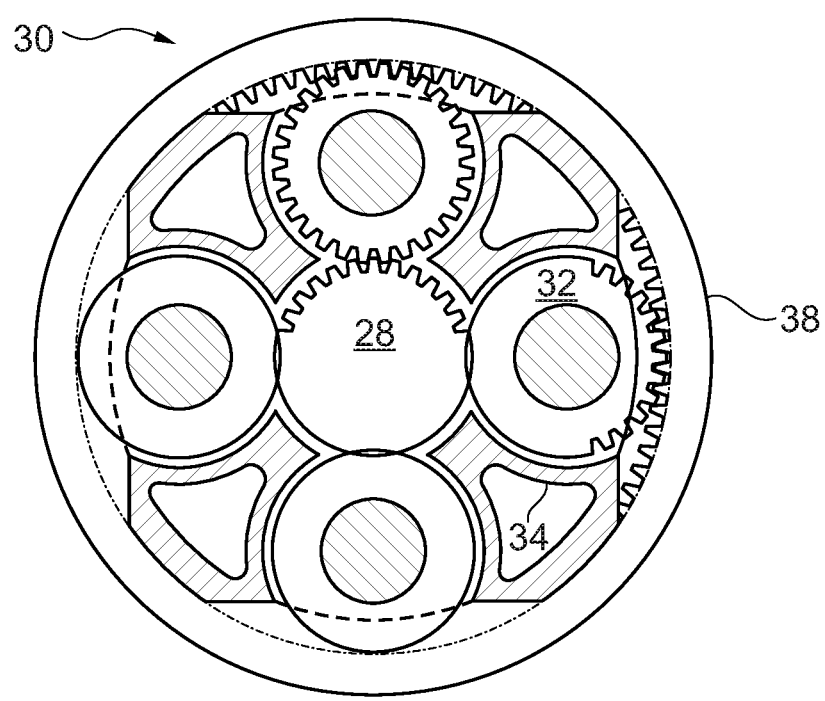
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
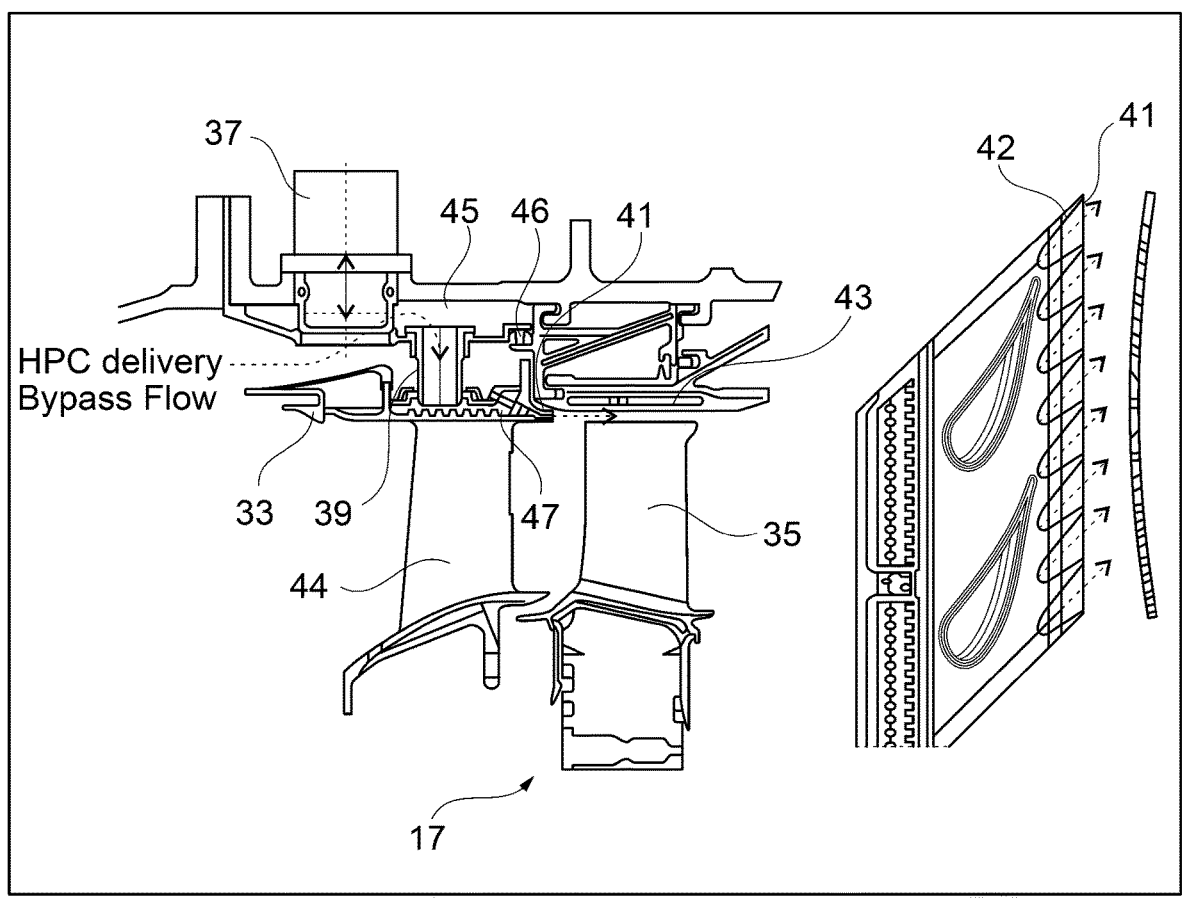
FIG. 4 is a sectional side view of an example core size modulation system according to the present disclosure.

FIG. 4 illustrates an example of such a modulation system. The core size modulation system comprises the air system 31 of FIG. 1, which is switchably operable between an on position and an off position so as to alter the core size of the engine by modulating the semi-dimensional mass flow of the engine core at the exit of the high-pressure compressor. The air system flows through a diversion path in which a portion of the air exiting the high-pressure compressor bypasses the combustion equipment to join the hot working gases at re-entry holes 41 located between the first row of nozzle guide vanes (NGVs) 44 and a rotor 35 at the front of the high-pressure turbine. That is, the high-pressure compressor delivery air flow is directed to bypass the NGVs.

The air system includes a rear outer discharge nozzle (RODN) 33 and an annular master plenum chamber 45 arranged with a plurality of switching plug (poppet) valves 37. Transfer pipes 39 deliver the air from the annular master plenum chamber 45 into the outer platform 47 of the nozzle guide vanes 44. Seal 46 prevents flow between the annular master plenum chamber 45 and the air cavity above the outer platform 47 of the nozzle guide vanes 44. Typically, there may be between one and ten, or between two and five, switching plug valves 37. Subsets of the switching plug valves 37 may be selectively actuated to allow control of the amount of air system flow ranging from all plug valves being in their fully off position to all plug valves being in their fully open position, such that the plug valves 37 may provide stepped modulation. Alternatively, all of the switching plug valves 37 may be simultaneously actuated via a single source so that they are actuated the same amount, as one entity. The level of air system flow modulation is a function of the number of controlling valves. The valves 37 may be on/off valves, or the valves may be fully variable valves.

The valves 37 are actuated by muscle air electrically controlled by solenoid blocks. A single solenoid block may be employed for each valve, thus providing independent control of each valve in the system. This is advantageous as it maximises the level of modulation for given number of valves, but at the expense of more complexity and available space. Alternatively, subsets of the valves may be controlled from a single solenoid, at the expense of less modulation.

The right-hand side image illustrates the view from above the nozzle guide vanes outer platform 47. This illustrates the accelerating ducts which accelerate the air exiting the air system into slots 42 and into re-entry holes 41 for reintroduction into the high-pressure turbine (HPT) main gas flow.

The core size modulation system presented in FIG. 4 is one example of a system that takes gas flow from the back of the high-pressure compressor and reintroduces it downstream of the first row of nozzle guide vanes in the high-pressure turbine. In the example of FIG. 4, the gas flow is reintroduced at the trailing of the outer platform nozzle guide vanes. However, it is anticipated that flow may be introduced anywhere downstream of the first row of nozzle guide vanes, for example, at the trailing of the inner platform nozzle guide vanes. In such an arrangement, some of the bypass air flow may be directed through the NGVs.

Figure 5A:
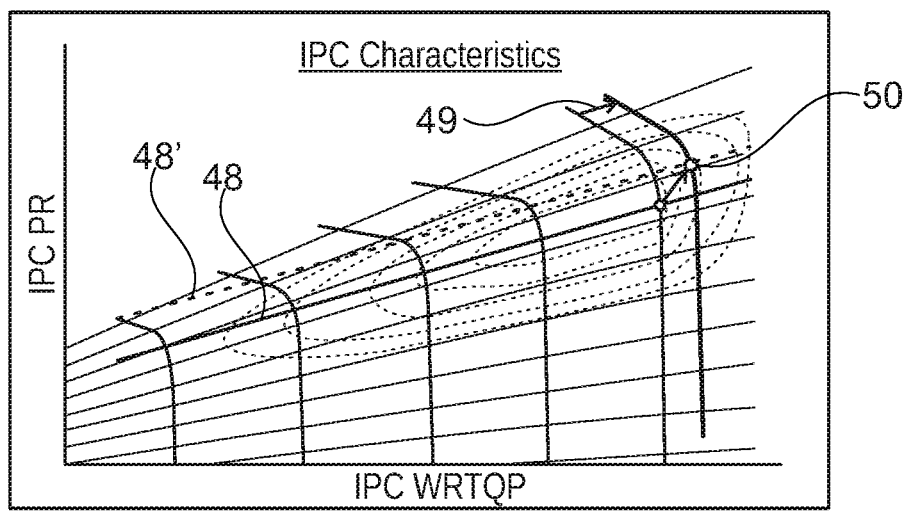
FIG. 5(a) is a graph plotting pressure ratio (PR) against the semi-dimensional flow parameter at the compressor inlet for a booster compressor (an intermediate pressure compressor)
Figure 5B:
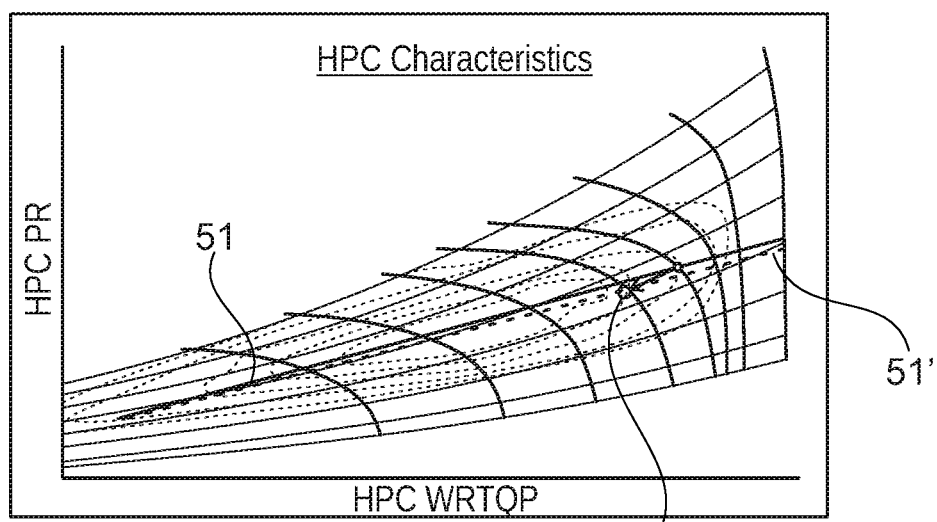
FIG. 5(b) is a graph plotting pressure ratio (PR) against the semi-dimensional flow parameter at the compressor inlet for a high-pressure compressor.

FIGS. 5(*a*) and 5(*b*) illustrate the effects of opening the booster compressor variable stator vanes. As the variable stator vanes are moved to a more open position, the booster compressor flow capacity increases, resulting in an increase in the flow through the core, when the booster compressor's speed is maintained. The booster compressor's speed may be maintained, for example, when it is coupled to the fan speed (e.g. via the gear box) and the engine is commanded to thrust. In other words, when the engine is commanded to keep the thrust constant to rotate the fan at a constant speed, the booster compressor's speed is maintained constant. The increase in flow through the core leads to a reduction in the core turbine (HPT) inlet temperature (T41). The drop in T41, in turn, causes a drop in the specific power of the high-pressure turbine and, thus, of the high-pressure compressor (HPC). This leads to a drop in the high-pressure compressor pressure ratio (HPC PR), moving the operating point 52 from the original working line 51 to a lower inlet semi-dimensional mass flow (WRQTP), or inlet flow function, on lower working line 51' as shown in dotted line in the HPC characteristics of FIG. 5(*b*). The WRTQP is defined as $$W * \frac{\sqrt{T}}{P},$$

where W is the mass flow, T is the total temperature and P is the total pressure. The reduction in the HP compressor inlet flow function causes the booster compressor (Intermediate pressure compressor, IPC) working line 48 to move up to the working line 48' shown in dotted line in FIG. 5(*a*), causing the booster compressor operating point 50 to move to a higher pressure ratio (IPC PR), and, thus, a higher temperature ratio. As a consequence of the reduction in the HP compressor inlet flow function (or in other words of the opening of the booster compressor variable stator vanes), there is a shift on the right in FIG. 5(*a*) of the semi-dimensional rotational speed line, as illustrated by arrow 49.

The semi-dimensional rotational speed, or corrected speed as used elsewhere herein, of the booster compressor is defined as $$\frac{N}{\sqrt{T}},$$

where N is the booster compressor rotational speed and T is the total temperature.

Figure 6:
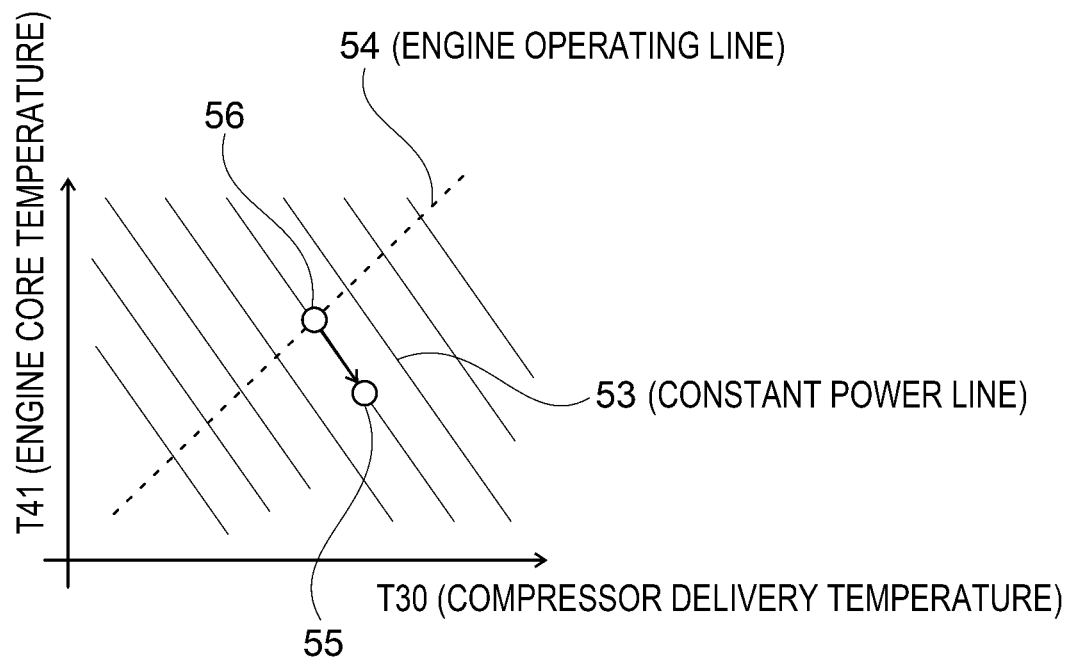
FIG. 6 is a graph plotting engine core temperature (T41) against compressor delivery temperature (T30), illustrating the effect that opening the variable stator vanes has on the engine's operating line.

FIG. 6 illustrates the effect that opening the booster compressor variable stator vanes has on the engine's operating temperatures. The engine operating line 54 represents the core temperature (T41) and compressor (HPC) delivery temperature (T30) for various power demands, when the engine has the booster compressor variable stator vanes operated according to a nominal schedule. For a given power demand, the initial operating point 56 indicates the T30 and T41 values when the engine is operating with the variable stator vanes closed, and the arrow indicates the effect that opening the booster compressor variable stator vanes has on the operating point 55. Namely, opening the booster compressor variable stator vanes reduces the T41 and increases the T30. The T41 is reduced by more than the T30 increases. Operating point 56 has been moved along constant power line 53 to new operating point 55. The changes in T41 and T30 therefore have no effect on the power supplied by the engine.

Figure 7:
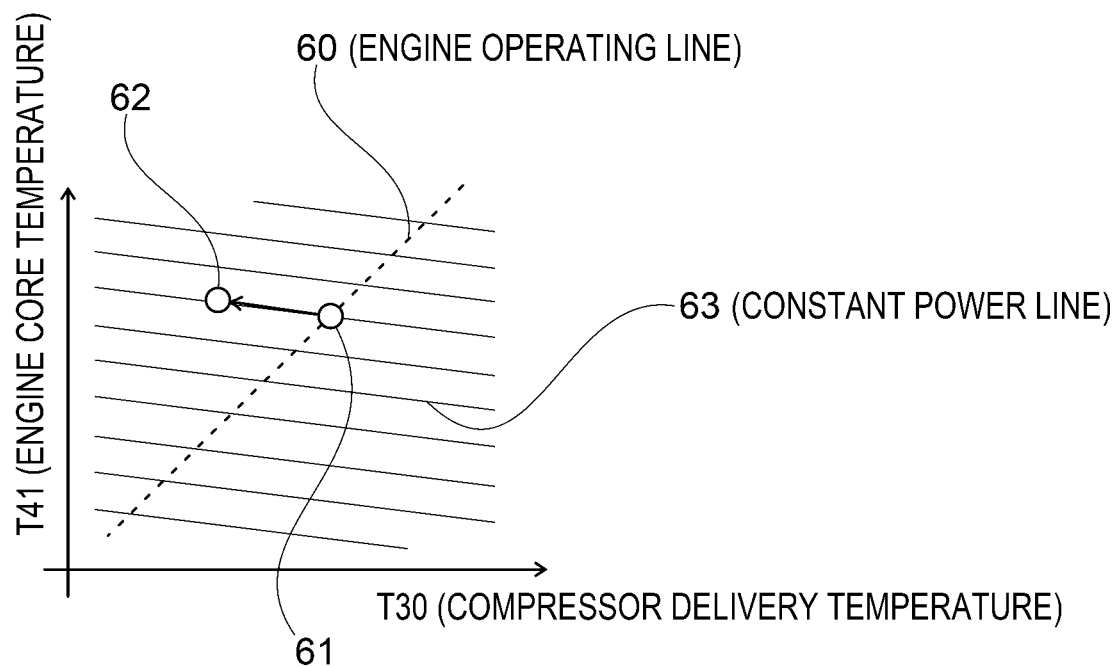
FIG. 7 is a graph plotting engine core temperature (T41) against compressor delivery temperature (T30), illustrating the effect that turning on the core size modulation system has on the engine's operating line.

FIG. 7 illustrates the effect that switching on the core size modulation system has on the engine's operating temperatures. The engine operating line 60 represents the T41 and T30 values for various power demands, when the core size modulation system is switched off. For a given power demand, the initial operating point 61 indicates the T30 and T41 values when the engine is operating with the core size modulation system switched off, and the arrow indicates the effect that switching the core size modulation system on has on the operating point 62. Namely, switching on the core size modulation system reduces T30 and increases T41. The T30 is reduced by more than the T41 increases. Operating point 61 has been moved along constant power line 63 to new operating point 62. The changes in T41 and T30 therefore have no effect on the power supplied by the engine.

The compressor booster's variable stator vanes and the core size modulation system are controlled so that during high power demands of the engine, both T30 and the core temperature (T41) are maintained within a predetermined maximum operating limit. This is physically achieved by moving the valve(s) in the core size modulation system to an on position and by moving the booster compressor variable stator vanes to a more open position.

Figure 8:
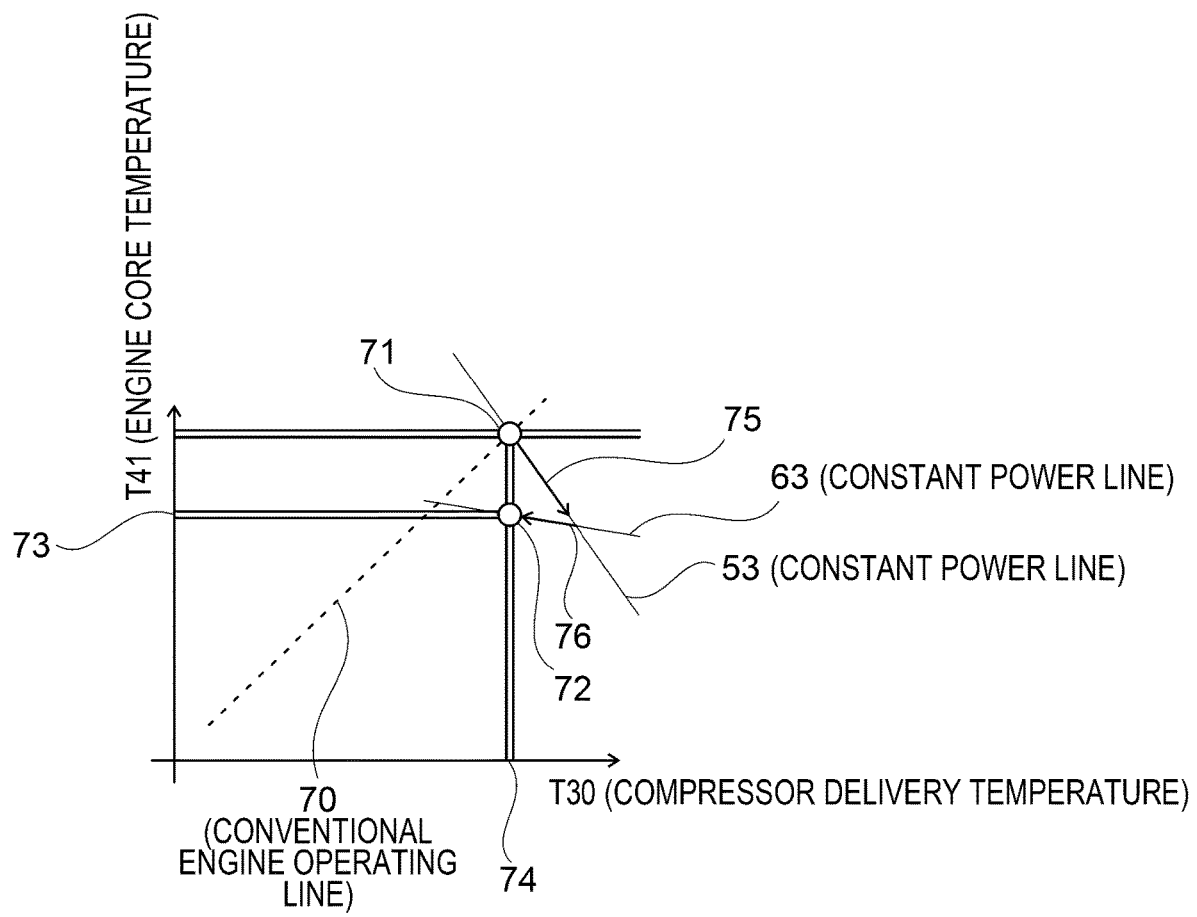
FIG. 8 is a graph plotting engine core temperature (T41) against compressor delivery temperature (T30), illustrating the combined effect that opening the variable stator vanes and turning on the core size modulation system have on the engine's operating line.

FIG. 8 illustrates the combined effects of controlling the booster compressor variable stator vanes and the core size modulation system on T30 and T41, as well as how the engine of the present disclosure would compare to a conventional engine. The operating line of a conventional engine 70 indicates the T30 and T41 values at which a conventional engine operates. For a given power demand, the initial operating point 71 indicates the T30 and T41 values when the engine is operating with the variable stator vanes closed and the core size modulation system switched off, and the arrows 75, 76 indicate the effect that opening the booster compressor variable stator vanes (75) and switching the core size modulation system on (76) has on the operating point, which moves to 72.

According to the control methods of the present disclosure, in response to the engine reaching a T41 that is above the T41 maximum operating limit 73, the booster compressor variable stator vanes are opened 75 to reduce the T41 to a level at or below the T41 maximum operating limit 73. This naturally increases the T30. In the illustrated example, T30 is increased to a level that is above the T30 maximum operating limit 74. In response to the engine reaching a T30 that is above the T30 maximum operating limit 74, the valve(s) in the core size modulation system are moved to an on position (76). FIG. 8 shows that an engine according to the present disclosure will therefore operate at a lower T41 and at the same T30 when compared to the operating point of a conventional engine of the same duty 71. Operating point 72 has been moved along constant power line 53 as the booster compressor variable stator vanes have been opened (75), and along constant power line 63 as the valve(s) in the core size modulation system have been moved to an on position (76). The changes in T41 and T30 therefore have no effect on the power supplied by the engine. A reduction in the LPT inlet temperature (T44) may also be achieved.

The booster compressor variable stator vanes may alternatively or additionally be controlled to open in response to the T41 approaching, i.e. within 2%, within 5%, for example from 2-5%, or within 10% of, the T41 maximum operating limit, and the valve(s) in the core size modulation system may alternatively or additionally be controlled to move to an on position in response to the T30 approaching, i.e. within 2%, within 5% or within 10% of, the T30 maximum operating limit. The booster compressor variable stator vanes may be controlled to open in response to the T41 and/or the T30 approaching an inclusive range bounded by any two of the values in the previous sentences (i.e. the values may form upper or lower bounds).

In some arrangements, the valve(s) (or subsets of these) in the core size modulation system may start in an open position when in idle and/or low power conditions, for example when at sea level or at altitude during descend conditions to help engine operation at off-design conditions. In this arrangement, the valve(s) in the core size modulation system may be controlled to shut in response to cruise conditions and/or altitude conditions, where engine efficiency is paramount. In some arrangements, the valve(s) in the core size modulation system may only be in a shut position during idle conditions or at off-design conditions to improve the engine operability or any other off-design requirement.

Where the core size modulation system comprises a plurality of controlling valves, opening of the valves to an on position may comprise opening an increasing number of the valves as the engine power demand is increased. Alternatively, where the core size modulation system comprises fully variable flow valves, opening of the valves may comprise progressively opening the valves towards an on position as the engine power demand is increased.

Figure 9:
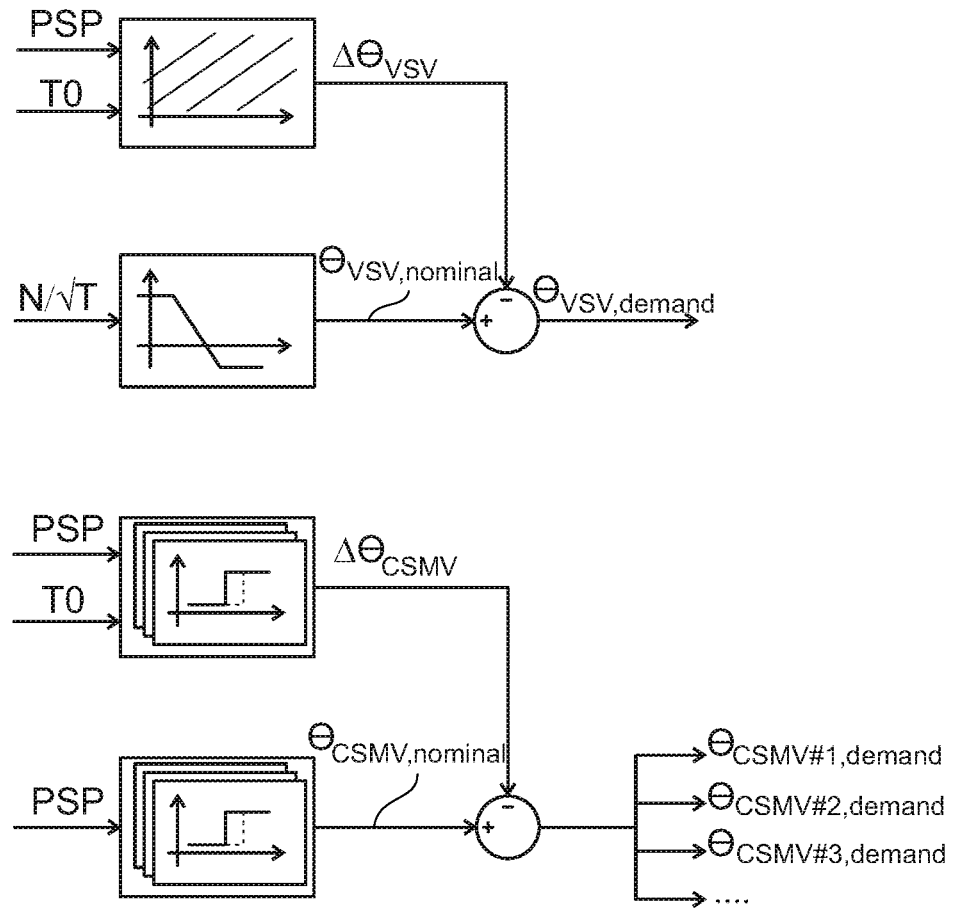
FIG. 9 is a flow diagram of a first method for controlling a booster compressor having variable stator vanes and a core size modulation system having at least three valves.

FIG. 9 illustrates a first method of controlling a booster compressor having variable stator vanes and a core size modulation system having at least three valves, to operate in the above-described manner.

The angle of the booster compressor variable stator vanes is adjusted according to a nominal schedule, which is determined by the semi-dimensional rotational speed of the booster compressor (N/√T), such that the variable stator vanes are opened further (i.e. the angle of the variable stator vanes is increased) as the booster compressor speed increases. The angle of the booster compressor variable stator vanes according to the nominal schedule is therefore calculated as $\theta_{VSV, nominal}$. Similarly, the position of the valves in the core size modulation system is adjusted according to a nominal schedule, which is determined by the engine power setting parameter (PSP), such that the valves in the core size modulation system are opened as the engine power demand increases. The position of the valves in the core size modulation system according to the nominal schedule is therefore calculated as $\theta_{CSMV, nominal}$.

During lower power demands, or in environmental conditions that enable the engine to operate with lower T41, such as cruise conditions in a CLE engine, T41 and T30 are unlikely to reach levels near to the maximum operating margins, and engine efficiency may therefore be the primary consideration in these conditions. In such conditions, the scheduling of the booster compressor variable stator vanes is such that the booster compressor variable stator vanes are in their most optimum position for maximum engine efficiency. Similarly, the scheduling of the valves in the core size modulation system is such that the valves are fully closed, in order to maximise the engine overall pressure ratio (OPR).

$\theta_{VSV, nominal}$ and $\theta_{CSMV, nominal}$ are also biased dependent on T41 and T30 measurements, to ensure that T41 and T30 are held within a maximum operating limit during operation of the engine, particularly during high power demands. That is, $\theta_{VSV, nominal}$ is biased dependent on a first input(s) representative of T41, and $\theta_{CSMV, nominal}$ is biased dependent on a second input(s) representative of T30.

When T41 is determined to be at, above, or approaching the T41 maximum operating limit, a bias $\Delta\theta_{VSV}$ is applied to the nominal schedule for the angle of the booster compressor variable stator vanes $\theta_{VSV, nominal}$, and when T30 is determined to be at, above, or approaching the T30 maximum operating limit, a bias $\Delta\theta_{CSMV}$ is applied to the nominal schedule for the position of the valves in the core size modulation system $\theta_{CSMV, nominal}$.

The nominal schedule for the angle of the booster compressor variable stator vanes $\theta_{VSV, nominal}$ and the bias $\Delta\theta_{VSV}$ are combined to generate a first output signal which determines an output demand for controlling the angle of the booster compressor variable stator vanes $\theta_{VSV, demand}$. The nominal schedule for the position of the valves in the core size modulation system $\theta_{CSMV, nominal}$ and the bias $\Delta\theta_{CSMV}$ are combined to generate a second output signal which determines an output demand for controlling the position of each of the valves in the core size modulation system $\theta_{CSMV\ \#1, demand}$, $\theta_{CSMV\ \#2, demand}$, $\theta_{CSMV\ \#3, demand}$.

Generally, it is difficult to obtain a direct measurement of T41, and this measurement is therefore taken either indirectly, or is inferred from other engine parameters. Therefore, one or more engine parameters which are determinative of the engine T41 may be used as the first input(s) representative of T41, and one or more engine parameters which are determinative of the engine T30 may be used as the second input(s) representative of the engine T30, the first and second input(s) being used to determine the biases $\theta_{VSV}$ and $\theta_{CSMV}$ respectively. In the first method illustrated in FIG. 9, both the first inputs and second inputs are the engine power setting parameter (PSP) and the inlet temperature to the intake of the gas turbine engine (T0).

Figure 10:
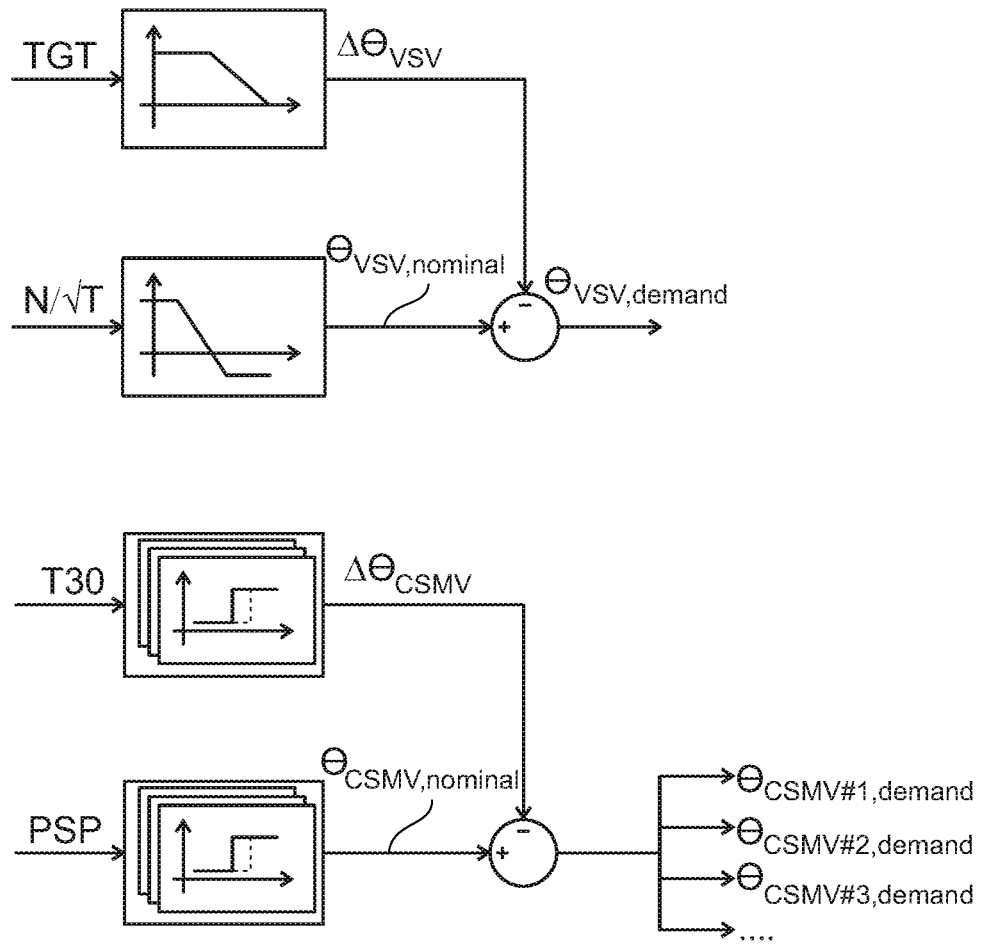
FIG. 10 is a flow diagram of a second method for controlling a booster compressor having variable stator vanes and a core size modulation system having at least three valves.

FIG. 10 illustrates a second method of controlling the variable stator vanes and the core size modulation system valves. The second method of FIG. 10 differs from the first method of FIG. 9 only in that the first input(s) and second input(s) differ. In the second method illustrated in FIG. 10, the first input is the low-pressure turbine entry temperature (TGT), and the second input is a direct measurement of T30.

Figure 11:
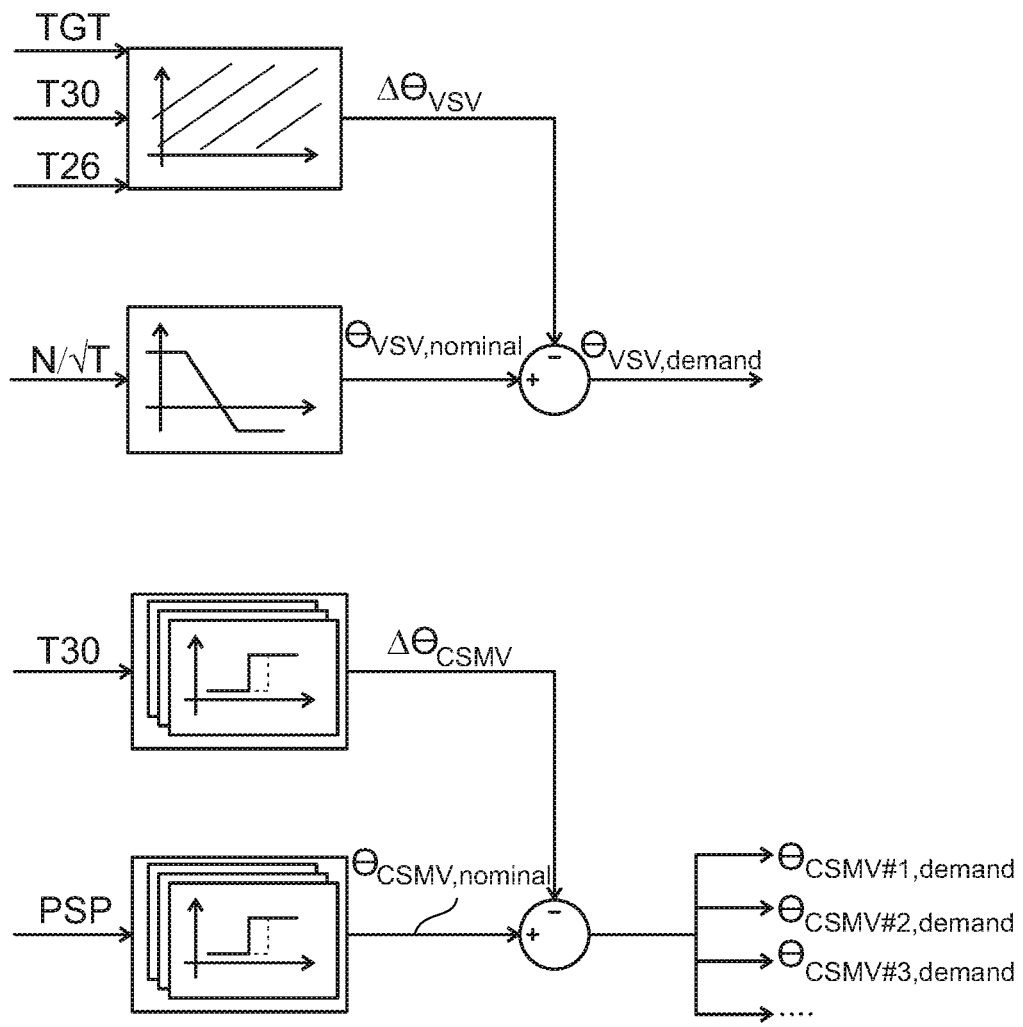
FIG. 11 is a flow diagram of a third method for controlling a booster compressor having variable stator vanes and a core size modulation system having at least three valves.

FIG. 11 illustrates a third method of controlling the variable stator vanes and the core size modulation system valves. The third method of FIG. 11 differs from the first method of FIG. 9 only in that the first input(s) and second input(s) differ. In the third method illustrated in FIG. 11, the first inputs are TGT, a direct measurement of T30 and HPC inlet total temperature (T26), and the second input is a direct measurement of T30.

Figure 12:
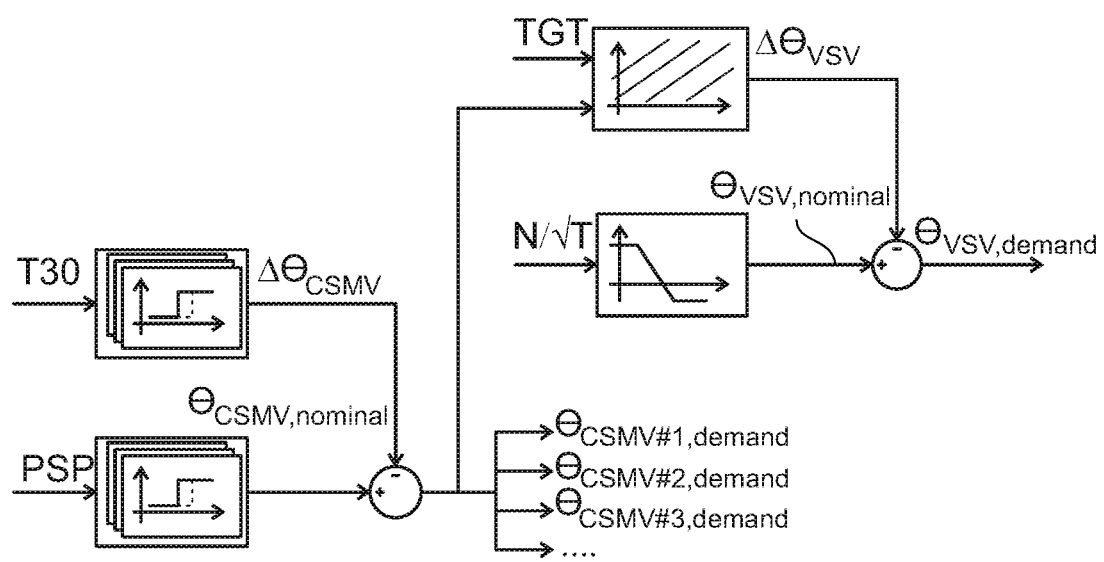
FIG. 12 is a flow diagram of a fourth method for controlling a booster compressor having variable stator vanes and a core size modulation system having at least three valves.

FIG. 12 illustrates a fourth method of controlling the variable stator vanes and the core size modulation system valves. The fourth method of FIG. 12 differs from the first method of FIG. 9 in that the first and second inputs differ. In the fourth method illustrated in FIG. 12, the second input is a direct measurement of T30, and the first inputs are TGT and the second output signal generated from the combination of the nominal schedule for the position of the valves in the core size modulation system $\theta_{CSMV, nominal}$ and the bias $\Delta\theta_{CSMV}$. That is, control of the booster compressor variable stator vanes is affected by the control of the core size modulation system.

Each of the previously described methods may be controlled via a processor and/or a controller and/or a memory and/or control circuitry. The processor and/or controller may be configured to read computer readable instructions to cause performance of the previously described methods. The computer readable instructions may be stored in the memory. Alternatively, the computer readable instructions may be inputted into the processor and/or the controller to cause performance of the previously described methods.

The gas turbine engine may also include sensors configured to sense each of the parameters described in relation to each of the previously described methods. More specifically, the gas turbine engine may include sensors for sensing a power setting parameter, the inlet temperature to the intake of the turbine, the turbine entry temperature, the compressor delivery temperature, and T26.

Each of the previously described methods may be extended so that the angle of the booster compressor variable stator vanes and the position of the valves in the core size modulation system are controlled by a proportional-integral-derivative (PID) controller.

Figure 13:
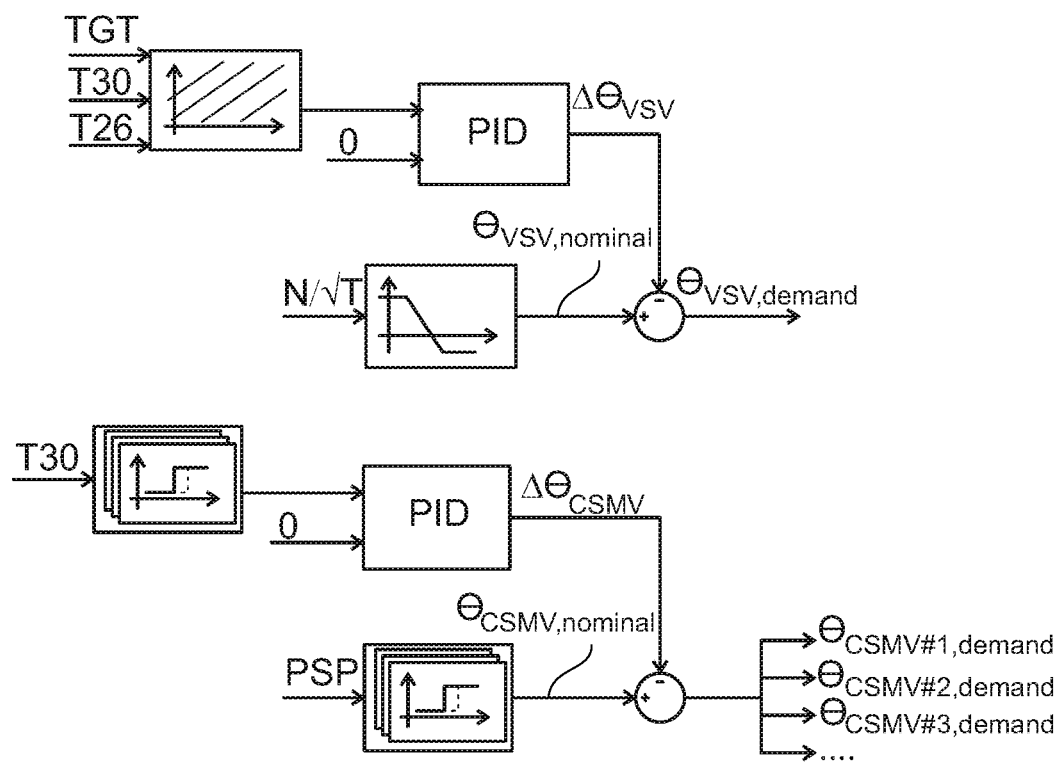
FIG. 13 is a flow diagram for the use of a proportional-integral-derivative (PID) controller to process the third method of FIG. 11.

FIG. 13 illustrates a PID controller used to control the third method of controlling the variable stator vanes and the core size modulation system valves, previously described in relation to FIG. 11.

Alternatively, each of the previously described methods may be integrated in a multivariable control method so that the angle of the booster compressor variable stator vanes and the position of the valves in the core size modulation system are controlled by a single multivariable controller.

Figure 14:
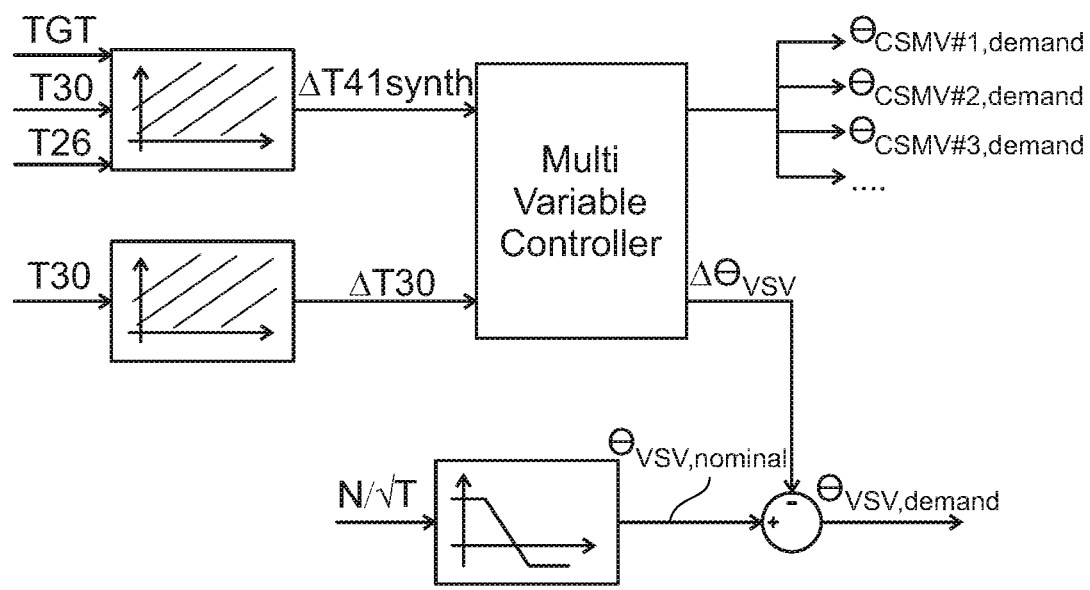
FIG. 14 is a flow diagram for the use of a multi variable controller to process the third method of FIG. 11.

FIG. 14 illustrates a multivariable controller used to control the third method of controlling the variable stator vanes and the core size modulation system valves, previously described in relation to FIG. 11.

Although each of the previously described methods of controlling the variable stator vanes and the core size modulation system valves have been described in relation to specific combinations of first and second inputs, it is anticipated that any, or any combination of, first and second input disclosed herein may be used to determine the bias $\theta_{VSV}$ and/or the bias $\theta_{CSMV}$.

The features and methods described herein may be advantageous in that they allow for optimisation of an engine's thermodynamic cycle according to the conditions in which the engine is operating. For example, the present disclosure allows the engine to be designed so it operates with higher OPR and T41 during conditions where temperature margins are not limiting and cycle efficiencies are paramount. Studies performed on a CLE geared fan engine have shown that this leads to improvements in the engine's specific fuel consumption (SFC). When considering the combination of a booster compressor having variable stator vanes and a 5% modulation system flow, the CLE geared fan engine's specific fuel consumption showed potential benefits in the order of 0.5% and 1%. Further cycle improvements may be possible with increased levels of modulation.

Alternatively, during high power demands, the present disclosure allows the T30 and T41 of the engine to be maintained within the same operational limits of a conventional engine of the same duty. This is realised whilst designing the engine with a smaller core compared to the conventional engine, which, in addition, means the engine weight is reduced when compared with a conventional engine.

Although the above embodiments have been described in relation to a specific bypass route with reference to nozzle guide vanes and a rotor, it should be understood that alternative bypass routes are anticipated, provided the "throat section" of the first row of nozzle guide vanes of the high-pressure turbine is bypassed. In this regard, the bypass air flow may be introduced anywhere downstream of the throat section of the first row of nozzle guide vanes. This could be, for example, in downstream stages of the turbine. For example, in the case of a two-stage high-pressure turbine, the air may be re-introduced in the second stage.

Some of the features and methods described herein may also provide one or more of the following advantages:
- They allow a more direct measurement of T30 and/or T41 to be used to control the variable stator vanes.
- They provide a more reliable indication of the T41 temperature.
- The configuration of the core size modulation system is taken into account when controlling the variable stator vanes. This may be advantageous in that the configuration of the core size modulation system may have an effect on the T41 temperature and/or its relationship with other parameters. This may also be particularly advantageous in failure cases. For example, if one of the valves in the core size modulation system fails, then the control of the variable stator vanes can be altered accordingly.
- Improved compressor operability (i.e. surge margin) at low/idle power conditions without incurring the noise and reduced efficiency associated with conventional bleed valve systems.
- Reduced ground idle thrust resulting in improved aircraft brake wear.
- Additional cooling modulation in the nozzle guide vanes.
- Reduced NGV cooling flow consumption during cruise conditions, resulting in improved thrust-specific fuel consumption.

Whilst the described example relates to a turbofan engine, the present disclosure may also be applied in industrial gas turbines such as in a gas turbine with a free power turbine powering an external load with a fixed characteristic speed (e.g. electricity generators), or in military engines.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A control system for a gas turbine engine, the gas turbine engine comprising an engine core, the engine core comprising (i) combustion equipment, (ii) a first turbine, (iii) a first compressor, (iv) a first core shaft connecting the first turbine to the first compressor, (v) a second turbine, (vi) a second compressor, and (vii) a second core shaft connecting the second turbine to the second compressor, the control system comprising:
   at least one variable stator vane for controlling an angle at which gas enters the engine core, the at least one variable stator vane configured to move between an open position and a closed position; and
   a bypass passage provided within the engine core for directing gas flow to bypass the combustion equipment, and
   a controller configured to:
      adjust the at least one variable stator vane according to a first nominal schedule so as to control the angle at which gas enters the engine core, the first nominal schedule being dependent on a semi-dimensional rotational speed of the first compressor; and
      bias the adjustment of the at least one variable stator vane from the first nominal schedule in response to a first input, wherein the first input indicates that a temperature of the engine core is above, at, or approaching a first predetermined threshold, and wherein the first predetermined threshold is a maximum engine core temperature operating limit;
   wherein:
   the second turbine, the second compressor, and the second core shaft are arranged to rotate at a higher rotational speed than the first core shaft;
   the bypass passage directs gas flow from the second compressor to the second turbine;
   the second turbine comprises at least one nozzle guide vane and the bypass passage reintroduces the gas flow downstream of the at least one nozzle guide vane;
   the bypass passage comprises at least one valve for controlling an amount of air that enters the bypass passage.

2. The control system according to claim 1, wherein the first compressor comprises the at least one variable stator vane.

3. The control system according to claim 1, wherein the at least one variable stator vane comprises a plurality of variable stator vanes, and wherein the plurality of variable stator vanes are configured to be simultaneously moved to the same position between the open position and the closed position.

4. The control system according to claim 1, wherein the at least one valve comprises at least one variable valve configured to move between an on position and an off position; or the at least one valve comprises at least one on-off valve configured to move between an on position and an off position.

5. The control system according to claim 1, wherein either (i) the at least one valve comprises a plurality of valves, and the plurality of valves are controlled as one entity, or (ii) each valve of the plurality of valves is independently controllable.

6. The control system according to claim 1, wherein the at least one valve is configured to be adjusted according to a second nominal schedule so as to control the amount of air that enters the bypass passage, the second nominal schedule being dependent on a power setting parameter.

7. The control system according to claim 6, wherein the at least one valve is configured to be biased from the second nominal schedule in response to a second input.

8. The control system according to claim 7, wherein the second input indicates that a delivery temperature of the second compressor is above, at, or approaching, a predetermined threshold.

9. The control system according to claim 7, wherein the second input is a second compressor delivery temperature.

10. A gas turbine engine for an aircraft, the engine comprising:
   an engine core comprising (i) combustion equipment, (ii) a first turbine, (iii) a first compressor, (iv) a first core shaft connecting the first turbine to the first compressor, (v) a second turbine, (vi) a second compressor, and (vii) a second core shaft connecting the second turbine to the second compressor;
   a fan located upstream of the engine core, the fan comprising a plurality of fan blades;
   a gearbox that receives input from the first core shaft and outputs drive to the fan so as to drive the fan at a lower rotational speed than the first core shaft;
   at least one variable stator vane for controlling an angle at which gas enters the engine core, the at least one variable stator vane configured to move between an open position and a closed position;
   a bypass passage provided within the engine core for directing gas flow so as to bypass the combustion equipment, and
   a controller configured to:
      adjust the at least one variable stator vane according to a nominal schedule so as to control the angle at which gas enters the engine core, the nominal schedule being dependent on a semi-dimensional rotational speed of the first compressor;
      bias the adjustment of the at least one variable stator vane from the nominal schedule in response to a first input, wherein the first input indicates that a temperature of the engine core is above, at, or approaching a first predetermined threshold, and wherein the first predetermined threshold is a maximum engine core temperature operating limit;
   wherein:
   the second turbine, the second compressor, and the second core shaft are arranged to rotate at a higher rotational speed than the first core shaft;
   the bypass passage directs gas flow from the second compressor to the second turbine;
   the second turbine comprises at least one nozzle guide vane and the bypass passage reintroduces the gas flow downstream of the at least one nozzle guide vane;
   the bypass passage comprises at least one valve for controlling an amount of air that enters the bypass passage.

11. A control system for a gas turbine engine, the gas turbine engine comprising an engine core, the engine core comprising (i) combustion equipment, (ii) a first turbine, (iii) a first compressor, (iv) a first core shaft connecting the first turbine to the first compressor, (v) a second turbine, (vi) a second compressor, and (vii) a second core shaft connecting the second turbine to the second compressor, the control system comprising:
   at least one variable stator vane for controlling an angle at which gas enters the engine core, the at least one variable stator vane configured to move between an open position and a closed position;

a bypass passage provided within the engine core for directing gas flow so as to bypass the combustion equipment, the bypass passage comprising at least one valve for controlling an amount of air that enters the bypass passage; and at least one processor configured to read computer readable instructions to cause performance of:

adjusting of the at least one variable stator vane according to a first nominal schedule so as to control the angle at which gas enters the engine core, the first nominal schedule being dependent on a semi-dimensional rotational speed of the first compressor;

biasing the adjustment of the at least one variable stator vane from the first nominal schedule in response to a first input, wherein the first input indicates that a temperature of the engine core is above, at, or approaching a first predetermined threshold, and wherein the first predetermined threshold is a maximum engine core temperature operating limit; and adjusting of the at least one valve according to a second nominal schedule so as to control the amount of air that enters the bypass passage, the second nominal schedule being dependent on a power setting parameter, wherein:

the second turbine, the second compressor, and the second core shaft are arranged to rotate at a higher rotational speed than the first core shaft;

the bypass passage directs gas flow from the second compressor to the second turbine;

the second turbine comprises at least one nozzle guide vane and the bypass passage reintroduces the gas flow downstream of the at least one nozzle guide vane.

12. The control system according to claim 11, wherein the at least one processor is also configured to read computer readable instructions to cause performance of:

biasing the adjustment of the at least one valve from the second nominal schedule in response to a second input.

13. The control system according to claim 1, wherein the at least one valve is configured to be in an open position when the gas turbine engine is operating in idle and/or low power conditions.

* * * * *